United States Patent
Kano et al.

(10) Patent No.: US 11,212,165 B2
(45) Date of Patent: Dec. 28, 2021

(54) CONSENSUS-FORMING METHOD IN NETWORK, AND NODE FOR CONFIGURING NETWORK

(71) Applicant: bitFlyer Blockchain, Inc., Tokyo (JP)

(72) Inventors: Yuzo Kano, Minato-ku (JP); Takafumi Komiyama, Minato-ku (JP)

(73) Assignee: BITFLYER BLOCKCHAIN, INC., Tokyo (JP)

( * ) Notice: Subject to any disclaimer, the term of this patent is extended or adjusted under 35 U.S.C. 154(b) by 164 days.

(21) Appl. No.: 16/609,647

(22) PCT Filed: Jun. 29, 2018

(86) PCT No.: PCT/JP2018/024980
§ 371 (c)(1),
(2) Date: Oct. 30, 2019

(87) PCT Pub. No.: WO2019/004480
PCT Pub. Date: Jan. 3, 2019

(65) Prior Publication Data
US 2020/0112476 A1    Apr. 9, 2020

(30) Foreign Application Priority Data
Jun. 30, 2017 (JP) .............................. JP2017-128847

(51) Int. Cl.
*H04L 12/24* (2006.01)
*G06F 16/23* (2019.01)
(Continued)

(52) U.S. Cl.
CPC ........ *H04L 41/0672* (2013.01); *G06F 11/184* (2013.01); *G06F 16/2379* (2019.01);
(Continued)

(58) Field of Classification Search
None
See application file for complete search history.

(56) References Cited

U.S. PATENT DOCUMENTS 9,774,578 B1 *   9/2017   Ateniese ................... H04L 9/30
10,360,191 B2 *  7/2019   Christidis ............. H04L 9/3236
(Continued)

FOREIGN PATENT DOCUMENTS

| JP | 2003-67215 | 3/2003 |
| JP | 2015-146165 | 8/2015 |
| WO | WO 2017/060817 | 4/2017 |

OTHER PUBLICATIONS

M. Castro et al., "Practical Byzantine Fault Tolerance and Proactive Recovery", Journal of ACM Transactions on Computer Systems, Nov. 2002, vol. 20, No. 4, pp. 398-461.
(Continued)

*Primary Examiner* — Andrew C Oh
(74) *Attorney, Agent, or Firm* — Cozen O'Connor

(57) ABSTRACT

A consensus building method suitable when f Byzantine failure nodes (f is an integer equal to or larger than 1 and smaller than N/3) are assumed in a network having N nodes (N is an integer equal to or larger than 1) participating in consensus building, comprising the steps of: receiving a first message from other node which communicates that the other node determined a message including data subject to consensus building valid as a proposal, when the number of received first messages reach a predetermined value Q, transmitting a second message to each node which communicates that it is accepting the proposal, and when the number of received first messages do not reach the predetermined value Q, transmitting a third message to each node which communicates that it is dismissing the proposal, when the number of received second messages reach a predetermined value Q, transmitting a fourth message to each note
(Continued)

which communicates that it is treating the proposal as agreed in the network, and when the number of received third messages reach a predetermined value Q, transmitting a fifth message for proceeding to a next round (a unit of consensus building process is called "round".) to each node, wherein the predetermined value Q is an integer equal to or larger than $(f+N+1)/2$ when a value of f is known, and wherein when the number of received first message reaches a predetermined value Q, a lock is set to limit behaviors thereafter.

15 Claims, 3 Drawing Sheets

(51) Int. Cl.
    *G06F 11/18*     (2006.01)
    *H04L 9/32*     (2006.01)

(52) U.S. Cl.
    CPC ........ *H04L 9/3239* (2013.01); *H04L 41/0816* (2013.01); *H04L 41/30* (2013.01); *G06F 2201/82* (2013.01); *H04L 2209/38* (2013.01)

(56) References Cited

U.S. PATENT DOCUMENTS

| | | | |
|---|---|---|---|
| 2016/0342987 A1 | 11/2016 | Thomas et al. | |
| 2017/0046689 A1* | 2/2017 | Lohe | G06Q 20/40 |
| 2017/0221052 A1* | 8/2017 | Sheng | G06Q 20/3829 |
| 2017/0236120 A1* | 8/2017 | Herlihy | G06F 21/57 |
| | | | 705/67 |
| 2017/0250796 A1* | 8/2017 | Samid | H04L 9/0838 |
| 2018/0020324 A1* | 1/2018 | Beauford | H04L 43/10 |
| 2018/0089638 A1* | 3/2018 | Christidis | G06Q 10/0639 |
| 2018/0096551 A1* | 4/2018 | Kraemer | H04L 9/3218 |
| 2018/0101560 A1* | 4/2018 | Christidis | H04L 9/3236 |
| 2018/0114218 A1* | 4/2018 | Konik | G06Q 40/08 |
| 2018/0121909 A1* | 5/2018 | Christidis | H04L 9/3236 |
| 2018/0123882 A1* | 5/2018 | Anderson | H04L 41/0813 |
| 2018/0189312 A1* | 7/2018 | Alas | G06F 21/64 |
| 2018/0227275 A1* | 8/2018 | Russinovich | H04L 9/3265 |
| 2018/0341930 A1* | 11/2018 | Moir | G06Q 20/3825 |
| 2019/0013943 A1* | 1/2019 | Maim | G06F 21/51 |
| 2019/0147438 A1* | 5/2019 | Micali | G06Q 20/389 |
| | | | 705/71 |
| 2019/0363889 A1* | 11/2019 | Wang | H04L 9/0643 |
| 2020/0021446 A1* | 1/2020 | Roennow | H04L 63/0478 |

OTHER PUBLICATIONS

H. Taniguchi, "Distributed Processing", Sep. 15, 2005, pp. 78-87, OHMSHA, Ltd.

International Search Report issued in corresponding PCT Application No. PCT/JP2018/024980.

Crain et al., "DBFT: Efficient Byzantine Consensus with a Weak Coordinator and its Application to Consortium Blockchains," Jul. 16, 2018, pp. 1-41.

\* cited by examiner

CONSENSUS-FORMING METHOD IN NETWORK, AND NODE FOR CONFIGURING NETWORK

RELATED APPLICATIONS

This is a U.S. National Phase Application under 35 USC 371 of International Application PCT/JP2018/024980 filed on Jun. 29, 2018.

This application claims the priority of Japanese application no. 2017-128847 filed Jun. 30, 2017, the entire content of which is hereby incorporated by reference.

TECHNICAL FIELD

The present invention relates to a consensus forming or consensus building method in a network and a node for configuring the network, and more particularly to a consensus building method suitable when the presence of Byzantine failure nodes is assumed in a network and a node for configuring the network.

TECHNICAL BACKGROUND

Blockchain is attracting attention as a technology that can replace the traditional mechanism for providing trust done by a centralized third party. A unit of data called "block" is given to a plurality of nodes participating in consensus building for the block, and its validity is evaluated at each node. When a predetermined condition is satisfied, each node determines that a consensus for the adoption of the block is formed among a plurality of possible blocks, and accepts the block. More specifically, the block is added to the blockchain of each node. A block for which a consensus is formed is proposed to each node by one of the nodes.

Here, consensus algorithm, namely how the consensus is formed or what is set as certain conditions for consensus forming affects the reliability and performance of a blockchain network. Depending on the consensus algorithm, the allowable number of failures where a node does not operate normally due to physical reasons such as communication conditions, power supply, etc. (also called "benign failures") differs, and the allowable number of any and all failures where a node does not follow the predetermined rules specified in a consensus algorithm (also referred to as "Byzantine failures") is different for example. As scenes where a node does not follow a predetermined rule, other than physical reasons, examples are when there is unauthorized access to the node, and when the administrator of the node has a wrong intention.

The degree of fault tolerance required for a blockchain network differs depending on the use of the blockchain, and various possibilities are currently being explored. In particular, for certain applications, there is a need for a consensus algorithm with Byzantine fault tolerance that can tolerate a predetermined number of Byzantine fault nodes as well as benign faults.

SUMMARY OF INVENTION

Problem to be Solved by the Invention

The properties generally required for a consensus algorithm are mainly safety and liveness, and the former means that all the nodes that behave normally shares the consensus without reversing it once a consensus is formed with respect to a certain data and the latter means that a consensus can be formed within a finite time.

Under what kind of consensus algorithm when f (where f is an integer equal to or greater than 1) Byzantine failure nodes are assumed each node should be operated to obtain sufficient safety and liveness, especially within a reasonable time will be a critically important question for the future diffusion of this technology. A consensus algorithm with safety may also be expressed as having finality.

The present invention has been made in view of a such problem, and an objective of the present invention is to provide a consensus building method suitable when f Byzantine failure nodes are assumed in a network having a plurality of nodes participating in consensus building and a program for the method and to provide a node that operates according to the consensus building method.

Means for Solving the Problem

In order to achieve such an objective, the first aspect of the present invention is a consensus building method suitable when f Byzantine failure nodes (f is an integer equal to or larger than 1 and smaller than N/3) are assumed in a network having N nodes (N is an integer equal to or larger than 1) participating in consensus building, comprising the steps of:

receiving a first message from other node which communicates that the other node determined a message including data subject to consensus building valid as a proposal, when the number of received first messages reach a predetermined value Q, transmitting a second message to each node which communicates that it is accepting the proposal, and when the number of received first messages do not reach the predetermined value Q, transmitting a third message to each node which communicates that it is dismissing the proposal, and when the number of received second messages reach a predetermined value Q, transmitting a fourth message to each note which communicates that it is treating the proposal as agreed in the network.

Further, the second aspect of the present invention is a method of the first aspect, wherein the predetermined value Q is an integer equal to or larger than $(f+N+1)/2$ when a value of f is known.

Further, the third aspect of the present invention is a method of the second aspect, wherein f is smaller than N/3.

Further, the fourth aspect of the present invention is a method of any one of the first to third aspects, wherein the second message is transmitted periodically or intermittently.

Further, the fifth aspect of the present invention is a method of any one of the first to fourth aspects, further comprising a step of transmitting a second message when the second message from other node in the same round (a unit of consensus building process is called "round.") is received.

Further, the sixth aspect of the present invention is a method of any one of the first to fifth aspects, the consensus building is completed when the fourth message is received from other node.

Further, the seventh aspect of the present invention is a method of any one of the first to sixth aspects, the third message is transmitted periodically or intermittently.

Further, the eighth aspect of the present invention is a method of any one of the first to seventh aspects, further comprising a step of transmitting a fifth message for proceeding to a next round (a unit of consensus building process is called "round.") to each node when the number of received third messages reaches a predetermined number Q.

Further, the ninth aspect of the present invention is a method of the eighth aspect, further comprising a step of transmitting a fifth message to each node when the fifth message from other node in the same round or a round larger than own node is received.

Further, the tenth aspect of the present invention is a method of any one of the first to ninth aspects, further comprising a step of deterministically selecting a node that makes the proposal for each round (a unit of consensus building process is called "round.").

Further, the eleventh aspect of the present invention is a method of tenth aspect, wherein each node is assigned an identifier that can be ordered in sequence, and the selection is performed by selecting a node having an order determined by r mod N, where r is the number of rounds.

Further, the twelfth aspect of the present invention is a method of any one of the first to eleventh aspects, wherein when the number of received first message reaches a predetermined value Q or a second message is received from other node, a lock is set to limit behaviors thereafter.

Further, the thirteenth aspect of the present invention is a method of twelfth aspect, wherein the limit includes to make a proposal which data subject to consensus building is same as the data subject to consensus building at the time when the lock was set when it is selected as a proposer node.

Further, the fourteenth aspect of the present invention is a method of the twelfth aspect, wherein the limit includes to allow transmission of a first message which communicates that it determined a message valid as a proposal when a proposal is received if data subject to consensus building is same as the data subject to consensus building at the time when the lock was set.

Further, the fifteenth aspect of the present invention is a method of any one of twelfth to fourteenth aspects, wherein when a second message in a larger round than when own node was locked is received, a new lock is set for data subject to consensus building in the larger round and behaviors thereafter are limited.

Further, the sixteenth aspect of the present invention is a method of any one of first to fifteenth aspects, wherein the second message includes evidence data which is a basis for determining that the predetermined value Q is satisfied.

Further, the seventeenth aspect of the present invention is a method of any one of first to sixteenth aspects, wherein the fourth message includes data subject to consensus building or a hash value calculated therefrom.

Further, the eighteenth aspect of the present invention is a method of any one of first to seventeenth aspects, wherein the data is a block, and each node adds the block to a blockchain of each node when the number of received second messages reaches a predetermined value Q.

Further, the nineteenth aspect of the present invention is a program for causing a computer to perform a consensus building method suitable when f Byzantine failure nodes (f is an integer equal to or larger than 1 and smaller than N/3) are assumed in a network having N nodes (N is an integer equal to or larger than 1) participating in consensus building, the method comprising the steps of:

receiving a first message from other node which communicates that the other node determined a message including data subject to consensus building valid as a proposal, when the number of received first messages reach a predetermined value Q, transmitting a second message to each node which communicates that it is accepting the proposal, and when the number of received first messages do not reach the predetermined value Q, transmitting a third message to each node which communicates that it is dismissing the proposal, and when the number of received second messages reach a predetermined value Q, transmitting a fourth message to each note which communicates that it is treating the proposal as agreed in the network.

Further, the twentieth aspect of the present invention is a node for consensus building suitable when f Byzantine failure nodes (f is an integer equal to or larger than 1 and smaller than N/3) are assumed in a network having N nodes (N is an integer equal to or larger than 1) participating in consensus building, which:

receives a first message from other node which communicates that the other node determined a message including data subject to consensus building valid as a proposal, when the number of received first messages reach a predetermined value Q, transmits a second message to each node which communicates that it is accepting the proposal, and when the number of received first messages do not reach the predetermined value Q, transmits a third message to each node which communicates that it is dismissing the proposal, and when the number of received second messages reach a predetermined value Q, transmits a fourth message to each note which communicates that it is treating the proposal as agreed in the network.

Advantageous Effect of Invention

According to one aspect of the present invention, by adopting unique configuration for each node's behaviors and communications between the nodes when a proposal message, a voting message, an accept message, a dismiss message, a commit message, and a next round message are respectively received, which will be described later, it is possible to provide a consensus building method suitable when assuming Byzantine failure nodes in a network having a plurality of nodes participating in consensus building.

DESCRIPTION OF EMBODIMENTS

Hereinafter, embodiments of the present invention will be described in detail with reference to the drawings.

First Embodiment

Assume that the total number of nodes participating in consensus building for some data—for example a block—is N (N is an integer of 1 or more), and the number of Byzantine failure nodes is f. The present invention provides a consensus building method that provides safety and liveness under this assumption.

Figure 1:
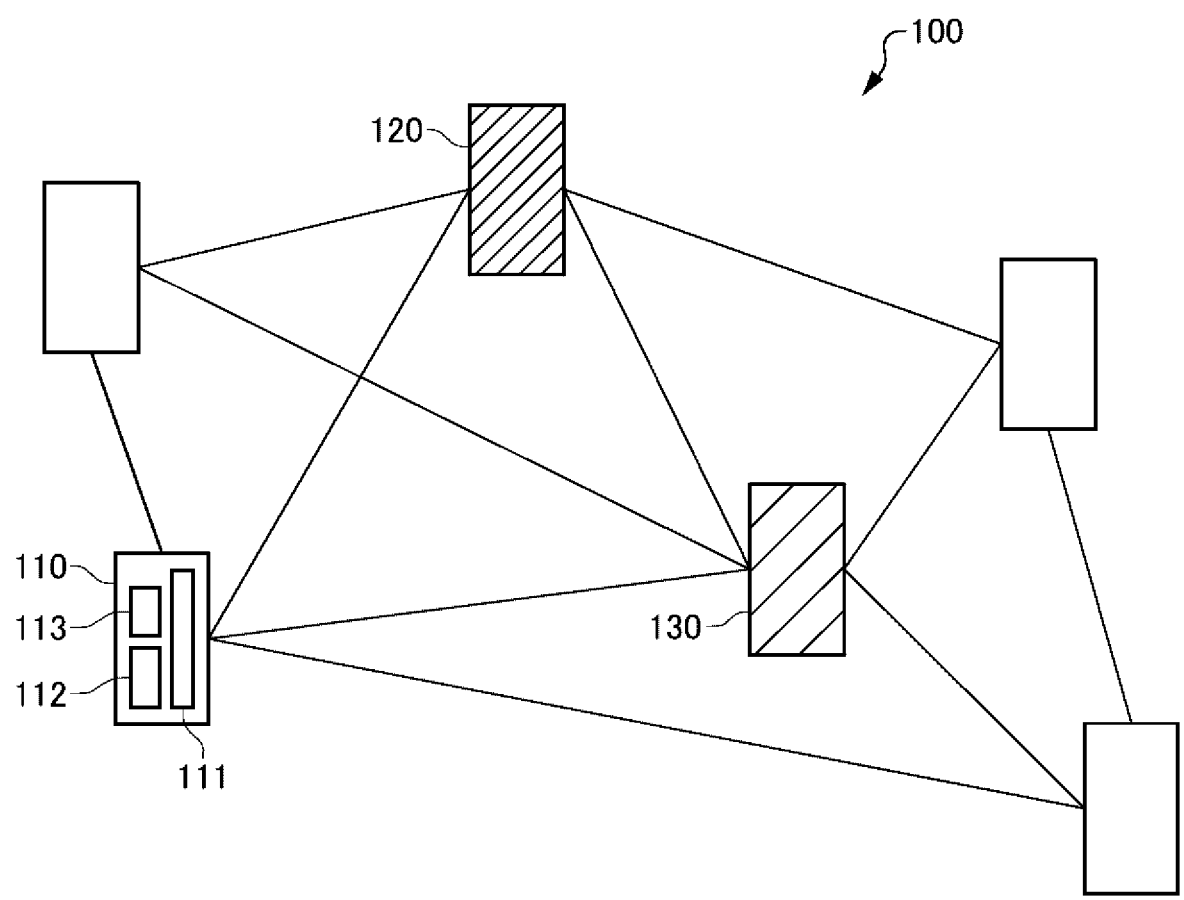
FIG. 1 shows the network in one embodiment of the present invention.

FIG. 1 shows a network in an embodiment of the present invention. In the network 100, N is 6 as an example, and each node 110 is a computer comprising a communication unit 111 such as a communication interface, a processing unit 112 such as a processor and a CPU, and a storage unit 113 including a storage device or a storage medium such as a memory and a hard disk. It can perform each processing described below by executing a predetermined program. The node 110 may include one or a plurality of devices or servers and the program may include one or more programs and may be recorded on a computer-readable storage medium to form a non-transitory program product. Only the node denoted by reference numeral 110 shows the hardware configuration, but the same applies to other nodes.

Rules for the consensus algorithm are defined in the predetermined program and can be stored in a storage unit 113 or a storage device or a storage medium accessible from each node 110 via a network. Nodes other than a Byzantine failure node 120 operate normally based on the rule. In the example of FIG. 1, f is 1.

Figure 2:
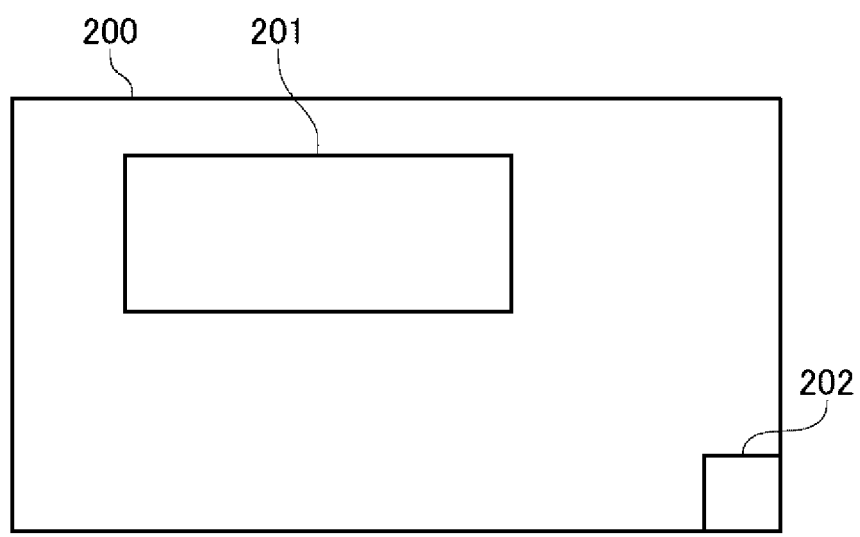
FIG. 2 shows a schematic diagram of the data structure of a message in one embodiment of the present invention.

Messages can be transmitted and received directly or indirectly between nodes to convey data for consensus building to other nodes constituting the network and to receive data from other nodes. As schematically shown in FIG. 2, the message 200 includes some data 201 such as a block to be transmitted, and in addition a signature 202 by a node which is the sender is added. Each node has a set of identifiers that are assigned to each node constituting the network and uniquely identify each node. By verifying the sender's signature 202 added to the message using the identifier, the node that transmitted the message can be confirmed. Specifically, the public key corresponding to the secret key associated with each node can be used as the identifier of the node, and the signature 202 can be generated using the secret key based on the message 200 or data 201 or a hash value calculated from these.

First, each node is in a wait state (S301), and one of the nodes is selected as a proposer 130 by a deterministic calculation. Here, "deterministic" means that the same result is obtained at any node. In the present invention, the unit of trials of a consensus building is called "round", and the number of rounds is represented by r. For example, the node 130 to be a proposer can be deterministically selected by calculating r mod N. As an example, the above set of identifiers can be composed of identifiers that can be ordered in sequence. When N is 6 and r is 1 the first node is selected, and when r is 2 the second node is selected. Instead of r mod N, r+a mod N (a is a constant) may be used. The above calculation is performed at each node, and each node stores the current round number r of its own node in the storage unit 113 or the round number r is accessible through the network so that the number r can be referred to and each node can determine whether own node is a proposer. As will be described later, each node may advance to the next round, so a message from a node in a different round from own node may be received.

The proposer 130 sends a message including data subject to a consensus building to each node constituting the network 100 together with a signature to make a proposal. After the transmission, the proposer enters a proposed state, and the other nodes enter a proposed state in response to receiving the message (S302). It is considered that the proposer also receives a proposal from its own node, and more generally, a node that has transmitted some message also receives a message from its own node. Here, receiving from the own node includes referring to a message stored in the own node. The proposer may proceed to be in a proposed state in response to receiving a proposal instead of its transmission. Further, the message for proposal and the other messages described below may include the current round number r.

Each node that receives the proposal evaluates the proposal and determines whether it is valid. Determining whether the proposal is valid includes determining whether the proposal was transmitted by the node selected as the proposer in the round, and for example, determination may further include determining whether the data format satisfies predetermined conditions including a predetermined format depending on the application. The node which determined the proposal to be valid transmits a message to that effect to each node with a signature of own node. The message may be called a vote message (which corresponds to "first message") in the sense of voting for a valid proposal. The voting message includes the proposal content or a hash value calculated therefrom as data 201. Also in the following processes, the validity of the received message can be determined as necessary, and only valid messages can be processed such as in counting. A node that has received a proposal may transition to a proposed state when the proposal is valid.

When the Byzantine failure node 120 makes a proposal to each node even though it is not the proposer 130, it is determined as invalid. In addition, when the proposer 130 is a Byzantine failure node 120, it is possible that the Byzantine failure node 120 makes a plurality of different proposals even though the same proposal should be made to each node for each round based on the predetermined rule defined in the consensus algorithm and it is also possible that the node 120 does not send the proposal to some nodes. In such a case, if the validity determination is only the appropriateness of the sender, since the Byzantine failure node 120 is effective as a proposer, each node sends a vote message for the proposal received by each node. Even in such a situation, consensus can be formed by the processes according to the present embodiment described below.

When the number of vote messages for the same proposal received within the same round reaches a predetermined value Q, each node sends a message indicating that the node accepts the proposal to each node with a signature, and makes a transition to an accepted state (S303-1). This message may be referred to as an acceptance message (which corresponds to "second message"). The acceptance message may include evidence data that is the basis for determining that the node satisfied the predetermined value Q. Specifically, the evidence data may be Q or more received voting messages or data corresponding thereto. The acceptance message can also include the proposal content or a hash value calculated therefrom. It is desirable for nodes in the accepted state to send acceptance messages periodically or intermittently to increase liveness.

Here, when the value of f is known, it is understood that the predetermined value Q is an integer of (f+N+1)/2 or more in order to ensure safety. Actually, it may be a minimum integer of (f+N+1)/2 or more. That is, in order to ensure safety, it is necessary that the predetermined value Q is not satisfied for a plurality of different proposals. For this purpose, when Q nodes vote, (N-f) normal nodes need to make the majority of votes, and $$Q > (N-f)/2$$

must be satisfied. Since there can be a maximum of f Byzantine failure nodes 120 among the Q nodes that have transmitted the vote message, $$Q-f > (N-f)/2$$

is required to be satisfied. This is equal to $$Q > (N+f)/2$$

and it can be expressed as (N+f+1)/2 or more.

In order to ensure the liveness, the number of normal nodes (N−f) is required to be equal to or greater than a predetermined value Q. Therefore, by substituting the above Q condition, the number f of Byzantine failure nodes 120 is required to be (N−1)/3 or less. This can also be expressed as less than N/3. If it is unclear that the value of f is (N−1)/3 or less, the predetermined value Q may be a minimum integer of (2N+1)/3 or more. As an example, when N is 4, Q is 3.

In addition, each node transmits a message with a signature that the node rejects the proposal in the round if the number of received vote messages does not reach the predetermined value Q within a predetermined time and makes a transition to a dismissed state (S303-2). The message may be referred to as a dismiss message (which corresponds to "third message"). For example, the predetermined time may be 10 seconds. Nodes that are in a dismissed state preferably send a dismiss message periodically or intermittently to increase liveness.

Next, when the number of received acceptance messages reaches a predetermined number Q, each node confirms the existence of evidence data of each message if necessary, and then transmits a message that the node will treat the proposal as agreed by the network 100 to each node, and the consensus building process is completed (S304). The message may be referred to as a commit message (which corresponds to "fourth message") in the sense that it is a commitment to treat the proposal as agreed. The commit message includes the proposed content or a hash value calculated from the proposed content. If the proposed content is a block, the block is added to the blockchain of the node upon completion. In addition, the commit message can include the proposal content or a hash value calculated therefrom. In addition, the commit message can include evidence data which is the basis for determining that the node satisfies the predetermined value Q. Specifically, the evidence data may be Q or more received messages or data corresponding thereto.

Figure 3:
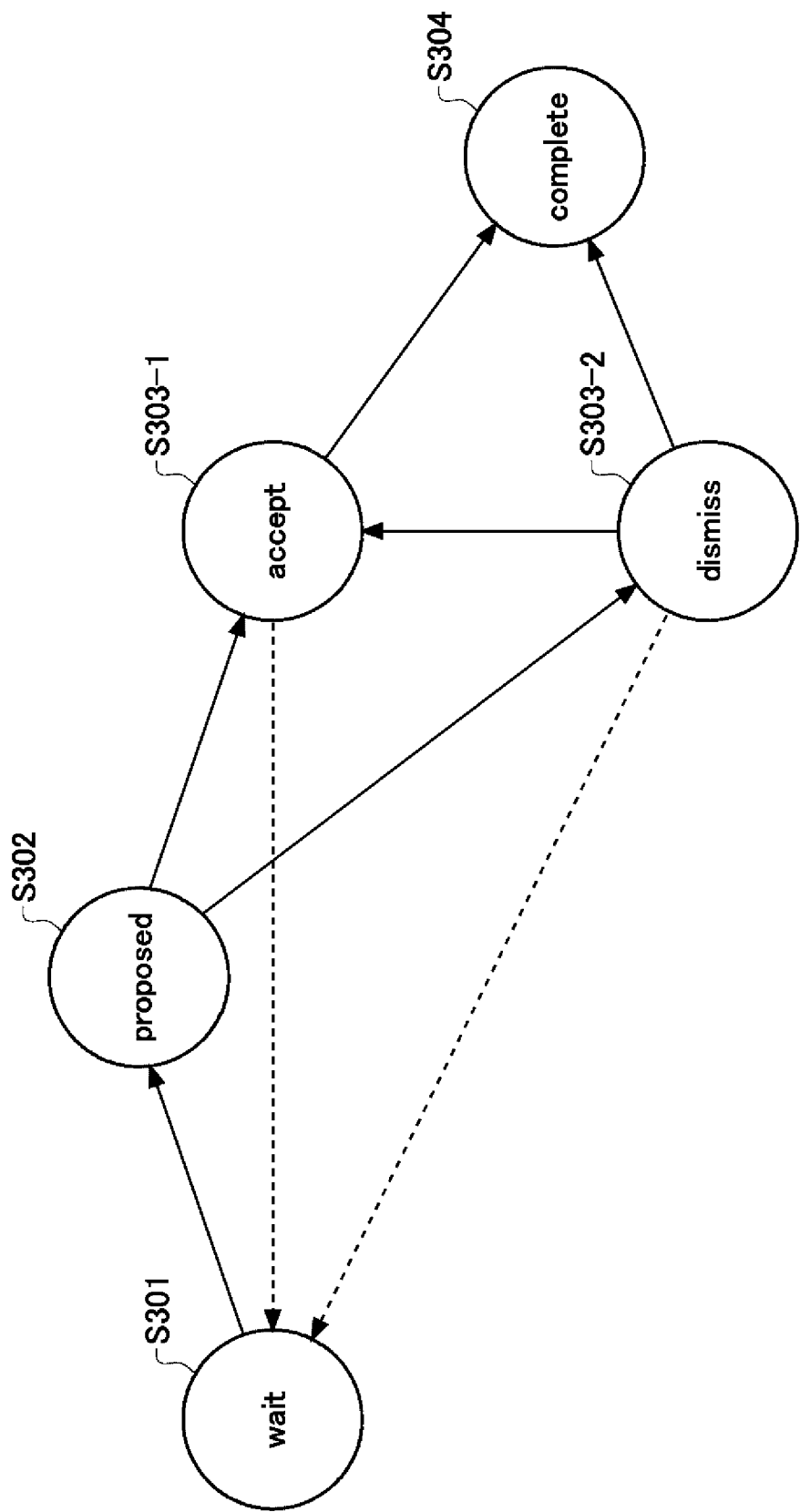
FIG. 3 shows the state transition of each node in one embodiment of the present invention.

In FIG. 3, the consensus building process is shown to be completed from the acceptance state or the dismiss state. However, even if each node is in a wait state or in a proposed state, as long as the condition is met, the consensus building process can be completed. The node which received a commit message confirms the existence of the evidence data as necessary and completes the consensus building process.

In addition, when the number of received dismiss messages reaches a predetermined number Q, each node transmits a message for proceeding to the next round to each node and makes a transition to a waiting state in the next round. The message may be referred to as a next round message (which corresponds to "fifth message"). Since no consensus has been reached, the process proceeds to the next round, and the process of consensus building proceeds under the new proposer 130. The next round message can include evidence data which is the basis for determining that the node satisfies the predetermined value Q. Specifically, the evidence data may be Q or more received dismiss messages or data corresponding thereto. Further, the next round message may include the proposal content or a hash value calculated therefrom.

In FIG. 3, a dotted arrow indicates that a transition from a acceptance state or a dismiss state to the waiting state in the next round is made. However, even if each node is in a waiting state or a proposed state, as long as the condition is met it can proceed to the next round. Also, if the above condition is not satisfied, each node can be configured to make a transition to a waiting state in the next round when the next round message in the same round is received from other node, and it can further be configured to transmit a next round message to each node.

In the above description, the transition from a proposed state to a acceptance state is described, but a transition can be generated from a waiting state or a dismiss state if the above condition is satisfied. Furthermore, even if the number of received vote messages does not reach a predetermined value Q, when an acceptance message in the same round from other node is received, a transition to an acceptance state may be made. Regarding the acceptance message from a round lower than its own node, it is possible that a Byzantine failure node 120 does not transmit an acceptance message in the round in which it should be transmitted but does so with a delay. If other nodes make an acceptance based on this, consensus may be formed on multiple proposals and there is a risk of bifurcation.

In addition, in the present specification, it should be noted that additional information may be considered if a description does not include "only" such as in "based only on xx", "according to xx only", or "in case of xx only."

Second Embodiment

In the second embodiment of the present invention, "lock" is set to limit the behaviors or operations of each node to a certain behaviors or operations with respect to the consensus building method according to the first embodiment. By locking, for example, a situation where a single node makes multiple votes is suppressed and security is increased by lowering the possibility that a predetermined value Q is satisfied for multiple different proposals to zero.

Specifically, a lock can be set when each node makes transition to an acceptance state. As an example, when locked, even if a proposal is received and the proposal is valid, a vote is not made unless the data subject to the consensus building is same as the data when the lock was set. In addition, when the own node is selected as the proposer, it is possible to force the node to propose the data subject to consensus building in the round when the lock was set.

Third Embodiment

Messages from different rounds may be received due to network disconnection, delay, etc. Specifically, when an acceptance message in a round larger than that of its own node is received, it is not ignored. If the node is locked, the lock can be released to update the round of own node to the larger round and further set a lock. If an acceptance message in a round that is lower than the round of own node but larger than the round when own node was locked is received, the lock can be released to set a lock with the proposal content in the round of the acceptance message. With respect to the number of rounds, the round of own node can be maintained. By enabling the release of a lock in this way, the liveness of consensus building can be enhanced. Since it is conceivable that a Byzantine failure node transmits an acceptance message in a larger round without any grounds, the existence of evidence data is confirmed as necessary.

Further, when a next round message in a round larger than that of own node is received, the round of own node may be updated to the larger round, and the next round message may be transmitted in that round.

In addition, when a proposal in a round larger than own node is received, the round of own node may be updated to the larger round, and when the proposal is valid, a vote message may be transmitted in that round. More specifically, when r is 2 or more, the proposal message may include a next round message of the previous round, and the node receiving the proposal may update the round of own node after confirming the existence of the evidence data of the next round message. Alternatively, when a proposal message is received, the transmission source node may be requested to transmit the next round message of the previous round.

In addition, a commit message may be received from a round different from that of own node. In this case, regardless of the round and whether or not there is a lock, the proposal in the round is treated as agreed by the network 100 and the consensus forming process can be completed.

REFERENCE SIGNS LIST

100 network
110 node
111 communication unit
112 processing unit
113 storage unit
120 Byzantine failure node
130 proposer
200 message
201 data
202 signature

The invention claimed is:

1. A consensus building method suitable when f Byzantine failure nodes (f is an integer equal to or larger than 1 and smaller than N/3) are assumed in a network having N nodes (N is an integer equal to or larger than 1) participating in consensus building, comprising the steps of:
    receiving a first message from other node which communicates that the other node determined a message including data subject to consensus building valid as a proposal,
    when the number of received first messages reach a predetermined value Q, transmitting a second message to each node which communicates that it is accepting the proposal, and when the number of received first messages do not reach the predetermined value Q, transmitting a third message to each node which communicates that it is dismissing the proposal,
    when the number of received second messages reach a predetermined value Q, transmitting a fourth message to each note which communicates that it is treating the proposal as agreed in the network, and
    when the number of received third messages reach a predetermined value Q, transmitting a fifth message for proceeding to a next round (a unit of consensus building process is called "round".) to each node,
    wherein the predetermined value Q is an integer equal to or larger than (f+N+1)/2 when a value of f is known, and
    wherein when the number of received first message reaches a predetermined value Q, a lock is set to limit behaviors thereafter.

2. The consensus building method according to claim 1, wherein the limit includes to make a proposal which data subject to consensus building is same as the data subject to consensus building at the time when the lock was set when it is selected as a proposer node.

3. The consensus building method according to claim 1, wherein the limit includes to allow transmission of a first message which communicates that it determined a message valid as a proposal when a proposal is received if data subject to consensus building is same as the data subject to consensus building at the time when the lock was set.

4. The consensus building method according to claim 1, the method further comprising the step of transmitting the second message to each node and set a lock to limit behaviors thereafter when a second message from the same round is received from other node.

5. The method according to claim 1, wherein the second message is periodically or intermittently transmitted.

6. The method according to claim 1, wherein consensus building is completed when a fourth message is received from other node.

7. The method according to claim 1, wherein the third message is periodically or intermittently transmitted.

8. The method according to claim 1, the method further comprising the step of transmitting the fifth message to each node when a fifth message from the same round or from a round higher than own round is received from other node.

9. The method according to claim 1, further comprising the step of deterministically selecting a node to make the proposal for each round.

10. The method according to claim 1, wherein a new lock is set with respect to data subject to consensus building in a higher round to limit behaviors thereafter when a second message from a round higher than own round at the time when a lock was set.

11. The method according to claim 1, wherein the second message includes evidential data which is a basis for determining that the predetermined value Q was reached.

12. The method according to claim 1, wherein the fourth message includes data subject to consensus building or a hash value calculated from the data.

13. The method according to claim 1,
    wherein the data is a block or a hash value thereof, and
    wherein the block is added to a blockchain of each node when the number of received second messages reach a predetermined value Q.

14. A non-transitory computer readable medium storing a program for having a computer to perform a consensus building method suitable when f Byzantine failure nodes (f is an integer equal to or larger than 1 and smaller than N/3) are assumed in a network having N nodes (N is an integer equal to or larger than 1) participating in consensus building, the method comprising the steps of:
    receiving a first message from other node which communicates that the other node determined a message including data subject to consensus building valid as a proposal,
    when the number of received first messages reaches a predetermined value Q, transmitting a second message to each node which communicates that it is accepting the proposal, and when the number of received first messages do not reach the predetermined value Q, transmitting a third message to each node which communicates that it is dismissing the proposal,
    when the number of received second messages reaches a predetermined value Q, transmitting a fourth message to each note which communicates that it is treating the proposal as agreed in the network, and
    when the number of received third messages reach a predetermined value Q, transmitting a fifth message for proceeding to a next round (a unit of consensus building process is called "round".) to each node,
    wherein the predetermined value Q is an integer equal to or larger than (f+N+1)/2 when a value of f is known, and wherein when the number of received first message reaches a predetermined value Q, a lock is set to limit behaviors thereafter.

15. A node for performing consensus building suitable when f Byzantine failure nodes (f is an integer equal to or larger than 1 and smaller than N/3) are assumed in a network having N nodes (N is an integer equal to or larger than 1) participating in consensus building, wherein the node:
   receives a first message from other node which communicates that the other node determined a message including data subject to consensus building valid as a proposal,
   when the number of received first messages reaches a predetermined value Q, transmits a second message to each node which communicates that it is accepting the proposal, and when the number of received first messages do not reach the predetermined value Q, transmits a third message to each node which communicates that it is dismissing the proposal,
   when the number of received second messages reaches a predetermined value Q, transmits a fourth message to each note which communicates that it is treating the proposal as agreed in the network, and
   when the number of received third messages reaches a predetermined value Q, transmits a fifth message for proceeding to a next round (a unit of consensus building process is called "round".) to each node,
   wherein the predetermined value Q is an integer equal to or larger than $(f+N+1)/2$ when a value of f is known, and
   wherein when the number of received first message reaches a predetermined value Q, a lock is set to limit behaviors thereafter.

* * * * *